Nov. 25, 1941.  R. V. GRAYSON  2,263,697
MACHINE FOR DEVEINING AND REMOVING THE SHELLS FROM SHRIMP
Filed Dec. 28, 1939  3 Sheets-Sheet 1
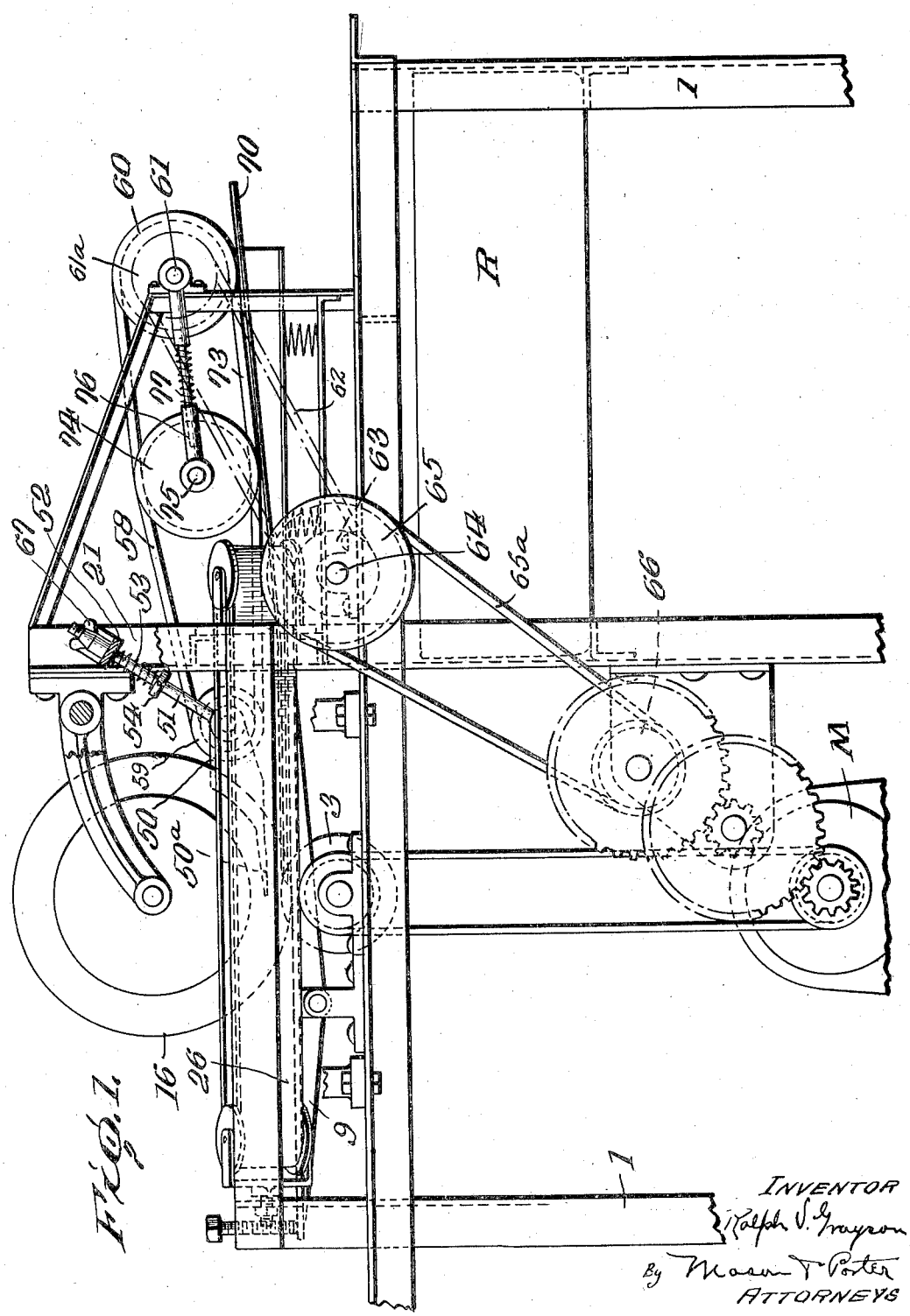
INVENTOR
Ralph V. Grayson
By Mason T. Porter
ATTORNEYS Nov. 25, 1941.   R. V. GRAYSON   2,263,697
MACHINE FOR DEVEINING AND REMOVING THE SHELLS FROM SHRIMP
Filed Dec. 28, 1939   3 Sheets-Sheet 2
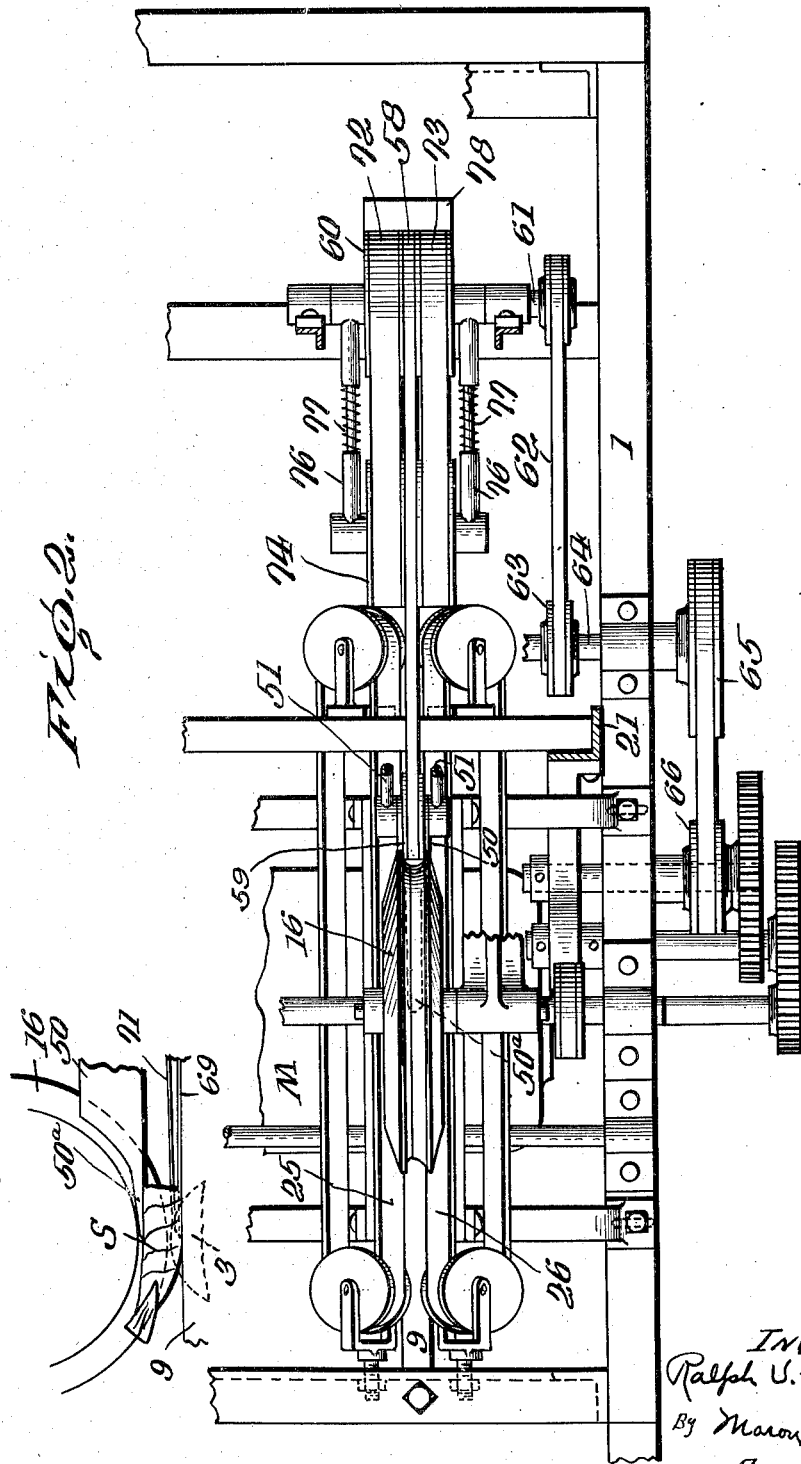
INVENTOR
Ralph V. Grayson
By Mason & Porter
ATTORNEYS

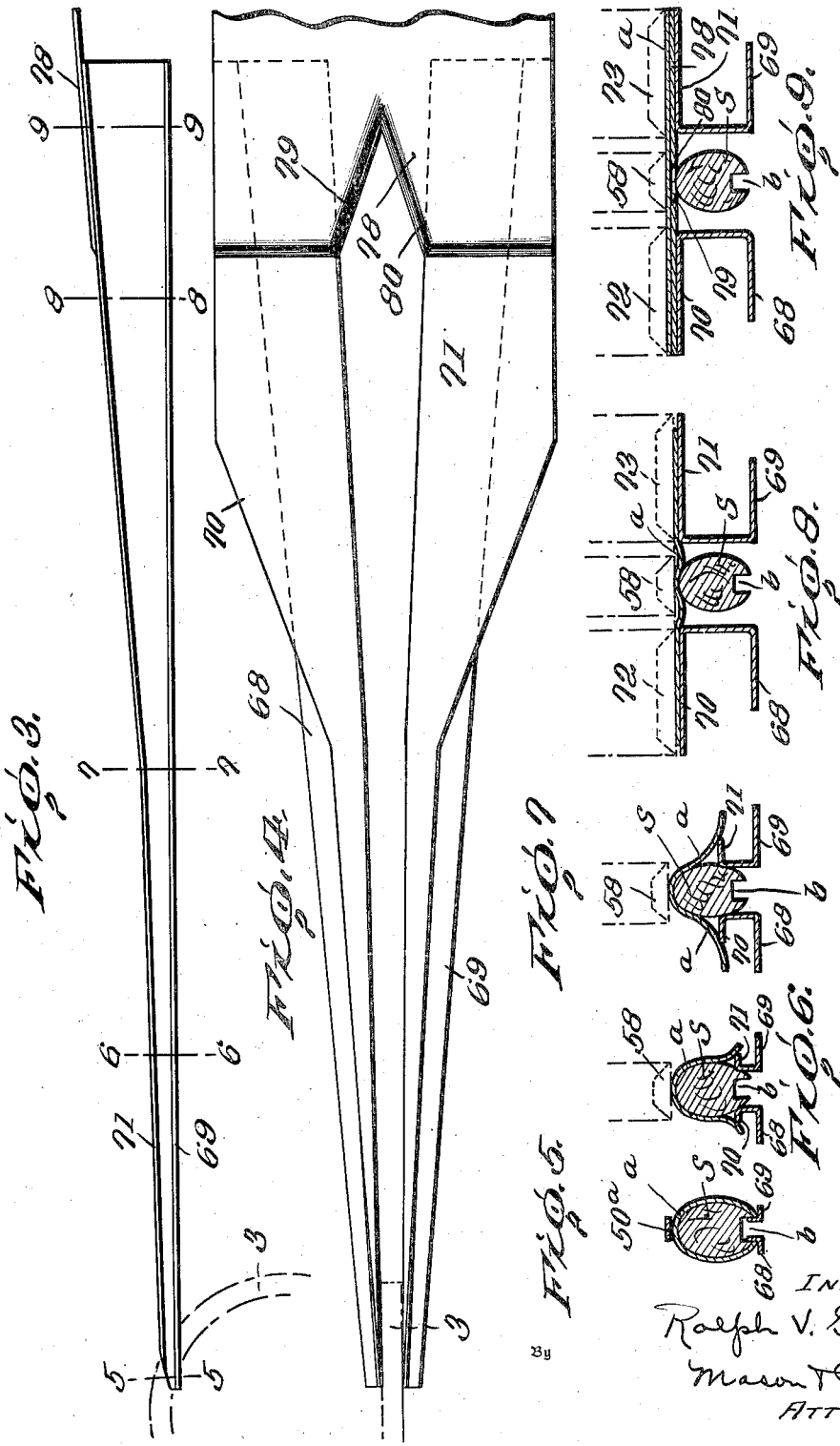

Patented Nov. 25, 1941

2,263,697

UNITED STATES PATENT OFFICE 2,263,697

MACHINE FOR DEVEINING AND REMOVING THE SHELLS FROM SHRIMP

Ralph V. Grayson, Houston, Tex., assignor to Kroger Grocery & Baking Company, Cincinnati, Ohio, a corporation of Ohio Application December 28, 1939, Serial No. 311,403

12 Claims. (Cl. 17—2)

In my co-pending application Serial No. 311,402, filed December 28, 1939, I have shown and described a machine for de-veining shrimp, in which the shrimp after the head has been removed therefrom is fed in an endwise direction to a cutting disk which cuts a channel along the back portion of the shrimp from the head to a point adjacent the tail, and simultaneously ruptures the sand vein beneath the shell and removes the same from the shrimp. The present invention is an improvement on the machine of my co-pending application.

An object of the present invention is to provide a machine which not only de-veins the shrimp, but also removes the shell therefrom.

A further object of the invention is to provide a machine wherein the shell is removed by a means which is adapted to enter between the cut edges of the shell formed during de-veining, and which gradually separates and raises the edge portions, thus stripping the shell from the shrimp progressively from the back of the shrimp to the belly portion.

A still further object of the invention is to provide a machine of the above type with means operating to separate the shrimp from the belly of the shell after the shell has been stripped from the back and side portions of the shrimp.

These and other objects will in part be obvious and will in part be hereinafter more fully disclosed.

In the drawings—

Figure 1 is a side view of a machine embodying the improvements with portions of one of the supporting posts broken away to show the means for mounting the presser shoe and the pulley at the feeding-in end of the presser belt;

Fig. 2 is a plan view at one side of the machine showing only one of the de-veining and shrimp removing units;

Fig. 3 is a side view of the stripper plates for removing the shell from the shrimp after it has been de-veined;

Fig. 4 is a plan view of the same;

Fig. 5 is a section on the line 5—5 of Fig. 3, and showing the stripper plates as they initially enter between the cut edges of the shell;

Fig. 6 is a section on the line 6—6 of Figure 3, showing the stripper plates as having partly stripped the shell from the body portion of the shrimp;

Fig. 7 is a sectional view on the line 7—7 of Fig. 3, showing the shell as stripped to a further extent and the shrimp as pressed by the presser belt downwardly between the stripper plates;

Fig. 8 is a section on the line 8—8 of Fig. 3, showing the shell as stripped from the side portions of the shrimp and the conveyor belts associated with the presser belt for feeding the shrimp and shell sections;

Fig. 9 is a sectional view on the line 9—9 of Fig. 3, showing the body portion of the shrimp as it is finally severed from the belly portion of the shell, and Fig. 10 is a detail showing more or less diagrammatically the cutting disk, the supporting bar, the presser roll, the shoe and the stripper plates with the shrimp being de-veined and passing on to the stripper plates beneath the shoe.

The machine includes generally a means for cutting a de-headed shrimp along the back or crest of the shell from the head portion to the tail. The cutting means is in the form of a cutting disk having saw teeth which project through a slot in the gauge bar along which the shrimp is fed. The gauge bar is preferably positioned so that the cutting disk not only cuts a channel in the shell, but it also cuts sufficiently into the flesh of the shrimp for rupturing and removing the sand vein. After the shell has been cut along the back portion thereof in the manner described, and while it is under the control of the feed belts, the shrimp is presented to a shell removing means which is in the form of fixed stripper plates having upstanding members which enter the channel formed in the shell of the shrimp during de-veining. These upturned members are provided with laterally extending flanges. The upstanding members are gradually spaced farther and farther apart, and the flanges are extended so that the shell is stripped from the body of the shrimp progressively from the back portion to the belly portion. During this stripping operation, the shrimp is pressed downwardly between the upstanding members of the stripper plate, and finally the shrimp passes beneath the plane of the laterally extending flanges which are joined by a V-shaped cutter, and this separates the body portion of the shrimp from the belly portions and shells. To assist in the removing of the shell from the shrimp, there are a presser belt and a shoe for directing the shrimp beneath the presser belt. This presser belt is relatively narrow and holds the shrimp depressed, finally forcing the same between the stripper plates. Associated with this presser belt are feed belts which engage the shell after it is stripped and discharges the same from the machine.

Referring more in detail to the drawings, the machine includes a frame structure indicated generally at 1, which is made from angle bars in the usual manner and a detail description thereof is not thought necessary. The means for receiving the shrimp after they have been de-headed and for removing the sand vein by cutting a channel along the back or crest of the shell from the head end to the tail, is shown and described in detail in my companion application above referred to, and will only be briefly referred to herein. The shrimp is fed along a gauge bar 9, which is slotted, and a cutting disk 3 projects through a slot in the gauge bar. The shrimp is placed with the back or crest portion of the shell on this gauge bar. It is fed along the gauge bar by feed belts which are inclined upwardly and away from each other. Opposed to the cutting disk is a presser roll 16 which is free to move up and down, and this presser roll bears on the shrimp and holds it against the gauge bar during the de-veining of the same. The cutting disk is positively rotated and will cut a channel in the shell along the back from the head portion to the tail. In the machine referred to, this channel is cut of sufficient depth into the flesh of the shrimp so as to rupture and remove the sand vein.

Associated with the presser roll is a presser shoe 50. This presser shoe 50 has a forwardly projecting portion 50a which extends beneath the presser roll. The end of the forwardly projecting portion is relatively thin and the shrimp will pass beneath this forwardly projecting portion so that the feed of the shrimp is kept under perfect control by this shoe initially holding the shrimp in contact with the feed belts after it leaves the presser roll. This presser shoe is associated with a presser belt 58. The presser belt 58 is relatively narrow and runs over a belt pulley 59. The belt pulley 59 and the shoe 50 are carried by rods 51 which are mounted for sliding movement with a supporting bar 52 which extends across the machine from the upstanding post 21 at one side of the frame to a similar post at the other side of the frame. There is a spring 53 mounted on each rod 51. This spring bears against a collar 54 at its lower end, which collar is fixed to the rod 51, and it bears against the supporting bar 52 at its upper end. The spring normally forces the shoe and the belt wheel in a general downward direction so that, as the shrimp pass beneath the shoe and then the presser belt, the shoe and presser belt will yield to permit shrimp of different sizes to pass beneath the same and at the same time be firmly brought into contact with the feed belts 25 and 26. The presser belt 58 runs over a V-shaped pulley 60 mounted on a shaft 61. The shaft 61 is carried by upstanding members mounted on the supporting frame 1. This shaft 61 is driven by a belt 62 running over a belt pulley 63 and over a pulley 61a fixed to the shaft 61. The pulley 63 is mounted on a shaft 64 which operates the feed belts 25 and 26. This shaft 64 has a belt wheel 65 attached thereto and the shaft 64 is driven by a belt 65a which runs over a belt wheel 66 on a driving shaft and the belt wheel 65. The shaft carrying the belt wheel 66 is driven by suitable gearing which is connected to the shaft of the motor M.

The presser shoe 50 and belt wheel 59 are forced downwardly by the springs 53, as noted above, and their downward movement is limited by stop nuts 67. The shaft 61 is mounted in brackets and does not have any yielding movement. However, the presser belt 58 is yieldingly pressed downwardly and receives the shrimp as it passes from beneath the shoe 50, holding it in contact with the feed belts 25 and 26, and finally taking up the feed of the shrimp after it leaves the feed belts 25 and 26.

In the drawings I have indicated diagrammatically the shrimp at S, and the shell portion of the shrimp at $a$ and the channel cut in the shrimp during de-veining at $b$. The means for stripping the shell from the shrimp includes stripper plates which are fixed to the frame of the machine in any suitable way. The stripper plates are shown in detail in Figures 3 to 9. The stripper plates 68 and 69 are each provided with upstanding members, and these stripper plates at their forward ends extend along the side faces of the cutting disk 3. These upstanding members will, therefore, enter the channel as it is being formed by the cutting disk 3 and before the edges of the shells which are cut by the disk are released, so that they can move toward each other. This is clearly shown in Figure 5, where the stripper plates are shown as extending into the channel and between the opposed cut edges of the shell preparatory to the stripping of the shell from the shrimp. The shrimp as it leaves the presser roll passes beneath the shoe, and the feed belts still contact with the same so that they convey the shrimp along the stripper plates. Shortly after the shrimp passes from beneath the shoe and under the presser belt, the upstanding members of the stripper plates 68 and 69 engage flanges 70 and 71 formed at the upper edges of these vertical members of the stripper plates. These flanges extend laterally, and are wedge-shaped so that they gradually force the shell away from the fleshy portion of the shrimp, and at the same time the presser belt presses the fleshy portion of the shrimp in between the vertical upstanding members of the stripper plates. These vertical members also gradually diverge away from each other to permit the body of the shrimp to pass between the same. In Figure 6, the stripper plates are shown as having separated the shell from the lower part of the fleshy portion of the shrimp which is along the back of the shrimp. These flanges gradually increase in width and the spacing of the vertical members also gradually increases in width, until the shell is stripped from a greater portion of the body of the shrimp as indicated in Figure 7.

Associated with the presser belt 58 are feed belts 72 and 73. These feed belts are V-shaped and run in V-shaped grooves in the pulley 60. They also run in grooves in the pulley 74. The pulley 74 is mounted on a shaft 75. Between the shaft 75 and the shaft 61 are telescoping links 76 and associated therewith are springs 77 which serve to put the feed belts 72 and 73 under tension. The presser belt 58 runs in a groove in this pulley 74 and supports the pulley. The feed belts will be yieldingly forced downwardly by the springs 53, 53 at their feeding-in end.

Referring to Figure 8 of the drawings, it will be noted that the stripper plates are shaped so that the side portions of the shell are raised into alignment with the belly portion of the shell and the fleshy body portion of the shrimp is still clinging to the belly portion and hangs suspended between the vertical portions of the stripper plates 68 and 69. The belts 72 and 73 now engage the shells on the flanges 70 and 71, respectively, and feed the shells along the stripper plates. There is a plate 78 extending across the flanges 70 and 71, and this plate is welded to the flanges. The plate is provided with cutting edges 79 and 80 which are arranged so that they intersect. The body of the shrimp passes beneath this plate 78, and the cutting edges 79 and 80 will separate the body portion from the belly portion of the shell and thus the shell, together with the tail, is completely removed from the shrimp. The shrimp drops between the plates into a receptacle indicated at R in Figure 1, while the shells are discharged from the ends of the flanges 70 and 71 into a suitable receptacle.

It is thought that the operation of the machine will be obvious from the detail description given above. The machine receives the shrimp after they have been deheaded and a channel is cut in the back or crest portion of the shrimp which is of sufficient depth to rupture and remove the sand vein. Before the shrimp leaves the de-veining saw, the stripper plates pass between the opposed edges of the shell formed by the cutting saw, and gradually the shell edges are separated and forcibly stripped from the fleshy or body portion of the shrimp. The shell is progressively stripped from the back to the belly portion, which greatly facilitates the removing of the shell, as it is well known that the shell clings very tightly to the back portions of the fleshy part of the shrimp, while it is much more easily stripped from the belly portion of the shrimp. After the shell has been stripped from the shrimp, except in the region of the belly portion, it is fed onto a cutter which finally separates the shell and tail from the fleshy or body portion of the shrimp. The machine is preferably provided with four separate units so that it may be adjusted to operate upon the different grades or sizes of shrimp. As for example, the small grade or size, the intermediate grade or size, the large grade or size, and the jumbo grade or size. The adjusting of the units is very readily accomplished to suit the size of the shrimp being de-veined and the stripping plates do not have to be changed but will operate upon shrimp of various sizes.

It is obvious that many changes may be made in the details of construction without departing from the spirit of the invention as set forth in the appended claims.

I claim:

1. A machine for de-veining and removing the shells from de-headed shrimp comprising means for cutting the shell along the back thereof from the head portion to the tail and rupturing and removing the sand vein therebeneath, means for removing the shell from the shrimp, and means for feeding the shrimp in succession to the de-veining means and the shell removing means.

2. A machine for de-veining and removing the shells from de-headed shrimp comprising means for cutting the shell along the back thereof from the head portion to the tail and rupturing and removing the sand vein therebeneath, means for separating the cut edges of the shell and for stripping the shell from the shrimp progressively from the back portion to the belly, means for subsequently separating the shrimp from the belly portion and tail, and means for feeding the shrimp in succession to the cutting means, the shell stripping means, and the means for separating the shrimp from the belly portion and tail.

3. A machine for removing the shell from a de-headed shrimp comprising means for cutting the shell along the back thereof from the head portion to the tail and rupturing and removing the sand vein therebeneath, means for separating the cut edges of the shell and for stripping the shell from the shrimp progressively from the back portion to the belly portion, and means for subsequently separating the shrimp from the belly portion and tail.

4. A machine for removing the shell from a de-headed shrimp comprising means for cutting the shell along the back thereof from the head portion to the tail and rupturing and removing the sand vein therebeneath, and spreader plates for separating the cut edges of the shell and for stripping the shell from the shrimp progressively from the back portion to the belly portion, said spreader plates being disposed so as to enter between the cut edges before said cut edges are released by the cutting means.

5. A machine for removing the shell from a de-headed shrimp comprising means for cutting the shell along the back thereof from the head portion to the tail and rupturing and removing the sand vein therebeneath, means for stripping the shell from the shrimp including stripper plates adapted to enter the channel between the cut edges of the shell, said stripper plates diverging and inclining upwardly whereby the shell is stripped from the shrimp progressively from the back portion to the belly portion, and means for feeding the shrimp along the stripping plates.

6. A machine for removing the shell from a de-headed shrimp comprising means for cutting the shell along the back thereof from the head portion to the tail, means for stripping the shell from the shrimp including stripper plates adapted to enter the channel between the cut edges of the shell, said stripper plates diverging and inclining upwardly whereby the shell is stripped from the shrimp progressively from the back portion to the belly portion, and means for feeding the shrimp along the stripping plates, said feeding means including a narrow presser belt bearing on the belly portion of the shrimp for holding the same from upward movement as the stripper plates strip the shell from the body of the shrimp.

7. A machine for removing the shell from a de-headed shrimp comprising means for cutting the shell along the back thereof from the head portion to the tail, means for stripping the shell from the shrimp including stripper plates adapted to enter the channel between the cut edges of the shell, said stripper plates diverging and inclining upwardly whereby the shell is stripped from the shrimp progressively from the back portion to the belly portion, and means for feeding the shrimp along the stripping plates, said feeding means including a narrow presser belt bearing on the belly portion of the shrimp for holding the same from upward movement as the stripper plates strip the shell from the body of the shrimp, said stripper plates having cutters disposed so as to separate the body portion of the shrimp from the belly portion of the shell and the stripped side portions of the shell.

8. A machine for removing the shell from a de-headed shrimp comprising means for cutting the shell along the back thereof from the head portion to the tail, feed belts for feeding the shrimp to and away from the cutting means, a presser roll associated with the cutting means, stripper plates adapted to enter between the cut edges of the shell as it leaves the cutting means, said stripper plates being constructed so as to diverge and incline upwardly for stripping the shell from the sides of the shrimp, a relatively narrow combined feeding and pressing belt adapted to engage the belly portion of the shrimp and feed the shrimp along the stripper plates while permitting the shell to be stripped from the sides of the shrimp, and conveyor belts alongside of said narrow belt and operating to engage the shell portions at opposite sides of the belly portion when said shell portions have been stripped from the body portions of the shrimp, said stripper plates being provided with a cutting means for separating the body of the shrimp from the belly portion and the stripped shell portions while the shrimp is being conveyed by said belts.

9. A machine for removing the shell from a de-headed shrimp comprising means for cutting the shell along the back thereof from the head portion to the tail, feed belts for feeding the shrimp to and away from the cutting means, a presser roll associated with the cutting means, stripper plates adapted to enter between the cut edges of the shell as it leaves the cutting means, said stripper plates being constructed so as to diverge and incline upwardly for stripping the shell from the sides of the shrimp, a relatively narrow combined feeding and pressing belt adapted to engage the belly portion of the shrimp and feed the shrimp along the stripper plates while permitting the shell to be stripped from the sides of the shrimp, conveyor belts alongside of said narrow belt and operating to engage the shell portions at opposite sides of the belly portion when said shell portions have been stripped from the body portions of the shrimp, said stripper plates being provided with a cutting means for separating the body of the shrimp from the belly portion and the stripped shell portions while the shrimp is being conveyed by said belts, yielding means for forcing the narrow presser belt downward at the receiving end thereof, and a presser shoe disposed between said narrow belt and a presser roll and yieldingly bearing on said shrimp for holding the same in engagement with the feed belts.

10. A machine for de-veining and removing the shells from de-headed shrimp comprising means for cutting the shell along the back from the head portion to the tail and for rupturing and removing the sand vein therebeneath, feeding means for feeding the shrimp to and from said cutting means, stripper plates adapted to enter between the edges of the shell as formed by the cutting means, said stripper plates having vertical portions and overhanging flanges, said stripper plates diverging away from each other for separating the edge portions of the shell, and said vertical portions being of gradually increasing height so as to raise the shell portions as they are stripped from the shrimp until said shell portions are brought into alignment with the belly portion of the shrimp, and a feeding means for feeding the shrimp along the stripper plates including a narrow belt yieldingly pressed against the shrimp for forcing it downward as the stripper plates lift and strip the shell portions from the side thereof.

11. A machine for de-veining and removing the shells from de-headed shrimp comprising means for cutting the shell along the back from the head portion to the tail and for rupturing and removing the sand vein therebeneath, feeding means for feeding the shrimp to and from said cutting means, stripper plates adapted to enter between the edges of the shell as formed by the cutting means, said stripper plates having vertical portions and overhanging flanges, said stripper plates diverging away from each other for separating the edge portions of the shell, and said vertical portions being of gradually increasing height so as to raise the shell portions as they are stripped from the shrimp until said shell portions are brought into alignment with the belly portion of the shrimp, and a feeding means for feeding the shrimp along the stripper plates including a narrow belt yieldingly pressed against the shrimp for forcing it downward as the stripper plates lift and strip the shell portions from the side thereof, said flange portions of the stripper plate being connected by cutting devices for operation to separate the body of the shrimp from the belly portion and the raised shell portions.

12. A machine for de-veining and removing the shells from de-headed shrimp comprising means for cutting the shell along the back from the head portion to the tail and for rupturing and removing the sand vein therebeneath, feeding means for feeding the shrimp to and from said cutting means, stripper plates adapted to enter between the edges of the shell as formed by the cutting means, said stripper plates having vertical portions and overhanging flanges, said stripper plates diverging away from each other for separating the edge portions of the shell, and said vertical portions being of gradually increasing height so as to raise the shell portions as they are stripped from the shrimp until said shell portions are brought into alignment with the belly portion of the shrimp, and a feeding means for feeding the shrimp along the stripper plates including a narrow belt yieldingly pressed against the shrimp for forcing it downward as the stripper plates lift and strip the shell portions from the side thereof, said flange portions of the stripper plate being connected by cutting devices for operation to separate the body of the shrimp from the belly portion and the raised shell portions, said feeding means including belts at each side of said narrow belt which engage the shell portions overlying the flanges of the stripper plates for moving the same along said stripper plates and delivering the same from the machine when the body portion of the shrimp has been separated therefrom.

RALPH V. GRAYSON.